(12) United States Patent
Scott

(10) Patent No.: US 11,608,104 B2
(45) Date of Patent: *Mar. 21, 2023

(54) STEERING BAR FOR LEVER CONTROLLED VEHICLE

(71) Applicant: Derrick F. Scott, Mobile, AL (US)

(72) Inventor: Derrick F. Scott, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/651,319

(22) Filed: Feb. 16, 2022

(65) Prior Publication Data

US 2022/0169299 A1    Jun. 2, 2022

Related U.S. Application Data

(63) Continuation of application No. 16/949,612, filed on Nov. 6, 2020, now Pat. No. 11,285,986.

(51) Int. Cl.
| | | |
|---|---|---|
| B62D 1/12 | (2006.01) |
| G05G 1/04 | (2006.01) |
| G05G 1/01 | (2008.04) |
| A01D 34/82 | (2006.01) |

(52) U.S. Cl.
CPC ............. *B62D 1/12* (2013.01); *A01D 34/824* (2013.01); *G05G 1/01* (2013.01); *G05G 1/04* (2013.01)

(58) Field of Classification Search
CPC ... B62D 1/12; B62D 1/24; G05G 1/01; G05G 1/04; G05G 1/06; G05G 1/10; B25B 5/06; B25B 5/061; B25B 5/062; B62K 21/125; B62K 21/14; B62K 21/16; A01D 34/824

See application file for complete search history.

(56) References Cited

FOREIGN PATENT DOCUMENTS

CA       3051450 A1 * 12/2018 ............. B60D 1/245

* cited by examiner

*Primary Examiner* — Adam D Rogers
(74) *Attorney, Agent, or Firm* — Squire Patent Consulting & IP Law LLC; Brendan E. Squire

(57) ABSTRACT

A steering bar for a lever-controlled vehicle provides for single hand operation of the lever-controlled vehicle. For example, the steering bar couples to the control levers for a zero-turn mower, providing safer, easier operation of the mower and making the mower handicap accessible. The steering bar can easily be installed on any dual steering zero turn mower. Steering is easier because turning it controlled by rotating the steering bar either right or left, with control of forward and reverse movements by pushing or pulling the bar. Speed, turning direction, or motion forward or reverse are all controlled by a single bar with a single hand. The steering bar is coupled with a selectively extensible control shaft to accommodate for the differing displacement length between the control levers during turning movements. The steering bar is coupled with the control levers with a ball and socket joint.

18 Claims, 6 Drawing Sheets

STEERING BAR FOR LEVER CONTROLLED VEHICLE

CROSS-REFERENCE TO RELATED APPLICATION

This application is a continuation and claims the benefit of priority to U.S. patent application Ser. No. 16/949,612 filed Nov. 6, 2020, the contents of which are herein incorporated by reference.

BACKGROUND OF THE INVENTION

The present invention relates to steering control mechanisms, and more particularly to steering control for lever controlled vehicles, such as a zero-turn mower and the like.

Lever controlled vehicles, such as zero-turn mowers and other tractor vehicles, require a user to use two hands to operate the vehicle. Zero-turn mowers require the user to use two hands to operate the vehicle. Zero-turn mowers are more efficient and maneuverable than lawn tractors, and they are much faster. However they are not easy to steer and they can be dangerous for unskilled users because the steering control is not intuitive and can be difficult to coordinate.

The lever controls also make the vehicle difficult to control in reverse maneuvering, while turning quickly, and while changing direction. These vehicles cannot be used by individuals with only one arm or those who may have disabilities preventing two handed operation.

As can be seen, there is a need for an improved steering bar for a lever controlled vehicle that permits one handed operation and improves control over the vehicle.

SUMMARY OF THE INVENTION

In one aspect of the present invention, a steering bar for a lever-controlled vehicle having a first control lever and a second control lever. The steering bar includes an elongate cylindrical shaft having a first end and a second end and a longitudinal length dimensioned to be interconnected with each of the first control lever and the second control lever. A control shaft is selectively extensible to accommodate for a length differential during a displacement of the first control lever and the second control with a turning movement control input to the lever-controlled vehicle via a rotation of the cylindrical shaft about a vertical transverse axis of the elongate bar.

In some embodiments, a ball and socket coupling is disposed between the control shaft and each of the first end and the second the elongate bar. Alternatively, a ball and socket coupling is disposed between the control shaft and each of the first control lever and the second control lever.

In some embodiments, a tensioning spring is configured to bias the control shaft to return the first control lever and the second control lever to a non-steering condition upon a release of the turning movement input from the elongate bar.

In some embodiments, the control shaft and tensioning spring are carried within an end of the elongate bar. Alternatively, the control shaft and the tensioning spring are carried within each opposed end of the elongate cylindrical shaft.

In other embodiments, the control shaft and the tensioning spring are carried within an end of at least one of the first control lever and the second control lever. Alternatively, the control shaft and the tensioning spring are carried within each of the first control lever and the second control lever.

In some embodiments, the steering bar also includes an end cap. The biasing spring is carried between a head of the control shaft and the end cap.

In yet other embodiments, the steering bar also includes a clamp that is configured to be removably attached to each of the first control lever and the second control lever. In this embodiment, the ball and socket coupling is attached to couple the clamp with the control shaft.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention.

Broadly, embodiments of the present invention provides an improved steering bar for a lever controlled vehicle, such as a zero-turn mower or similar tractor. The steering bar permits single handed operation and assists in coordinating control of the operating levers of the vehicle.

Figure 1:
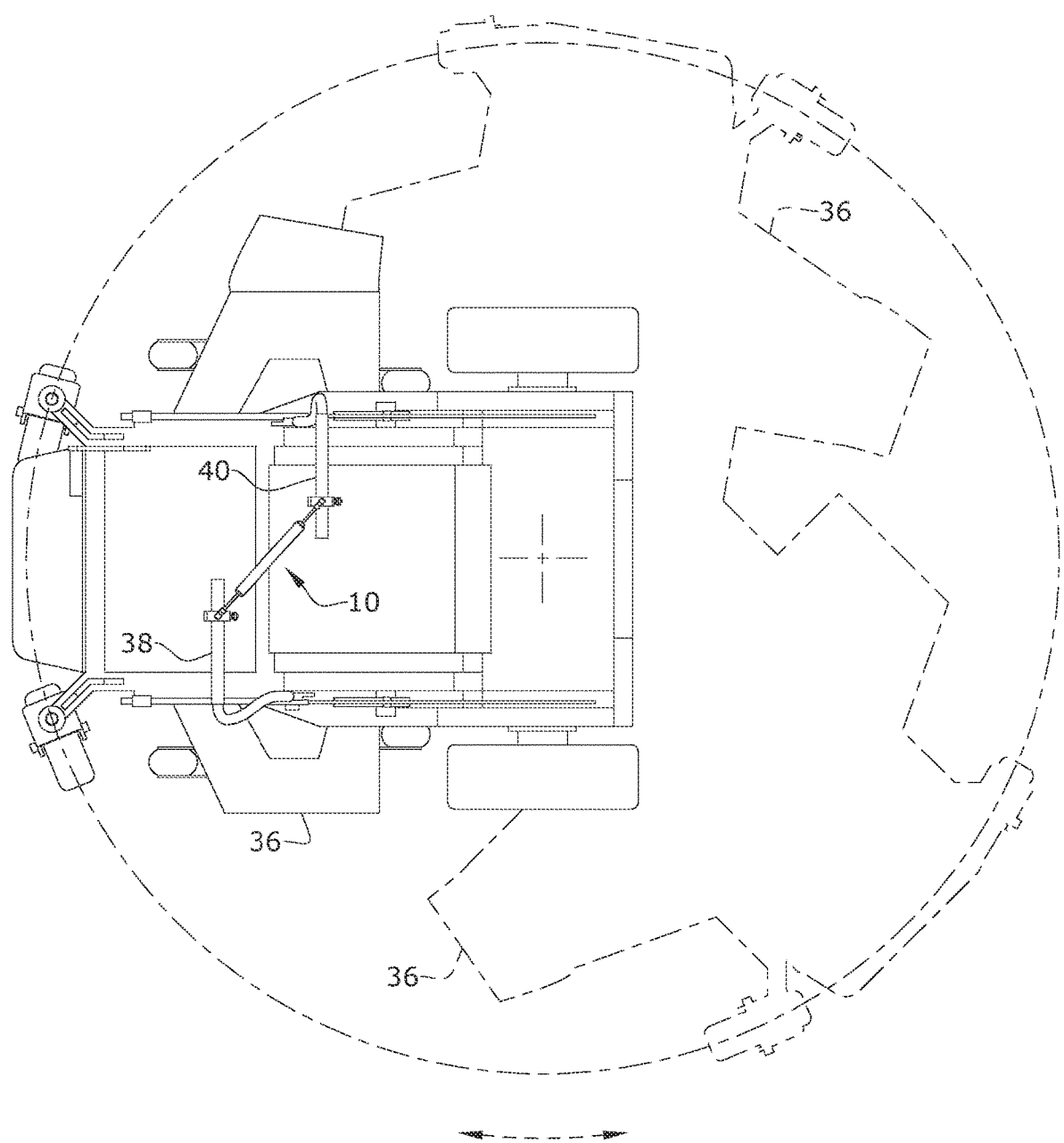
FIG. 1 is a top view of the steering lever shown in-use.
Figure 2:
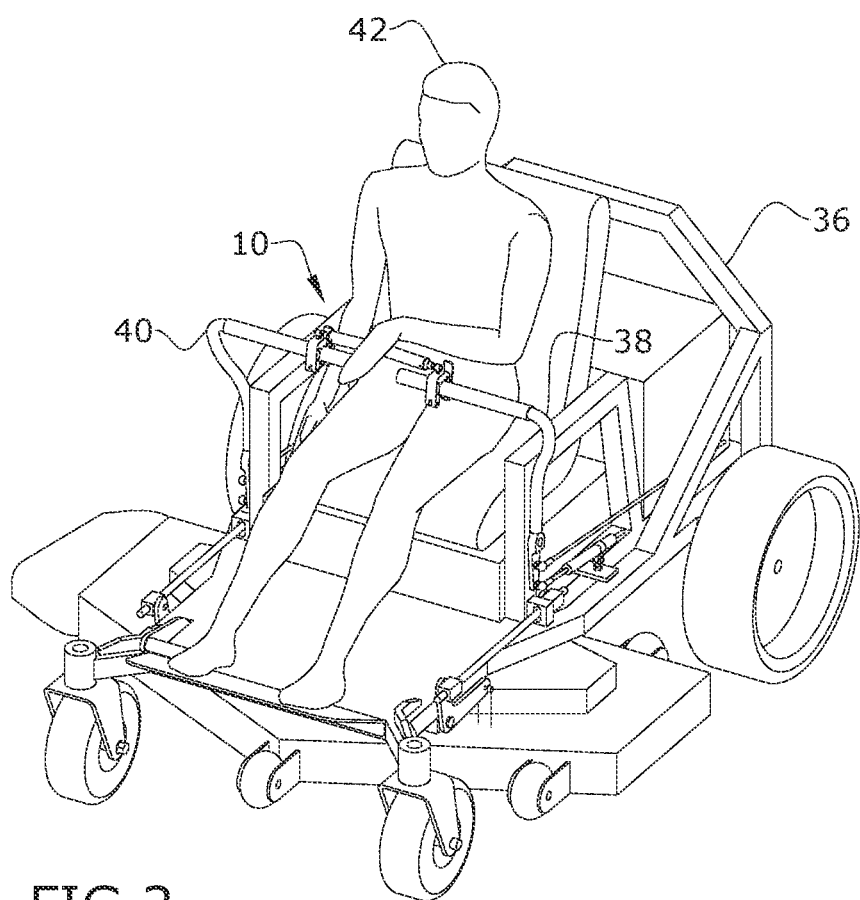
FIG. 2 is a perspective view of the steering lever shown in-use.
Figure 3:
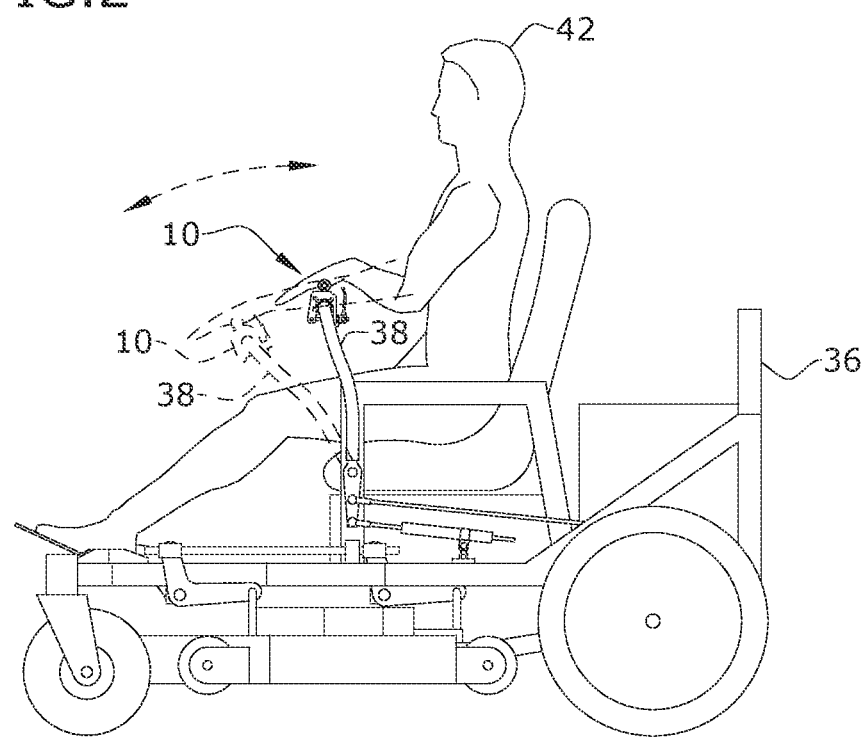
FIG. 3 is a side view of the steering lever shown in-use.
Figure 4:
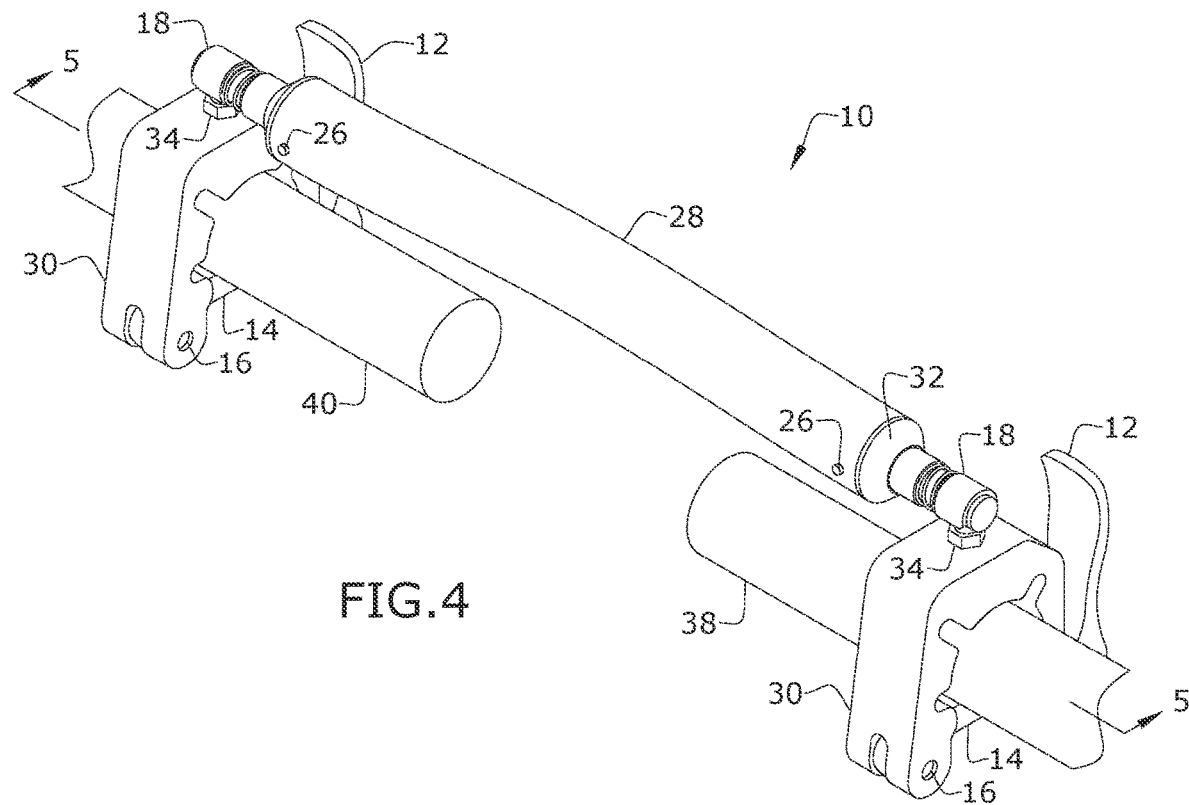
FIG. 4 is a perspective view of the steering lever.
Figure 5:
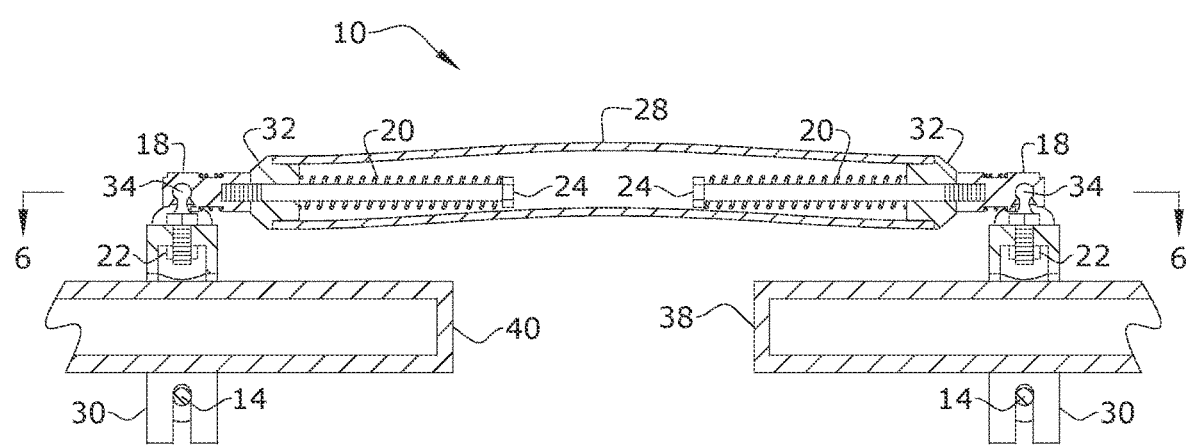
FIG. 5 is a section view taken along line 5-5 from FIG. 4.
Figure 6:
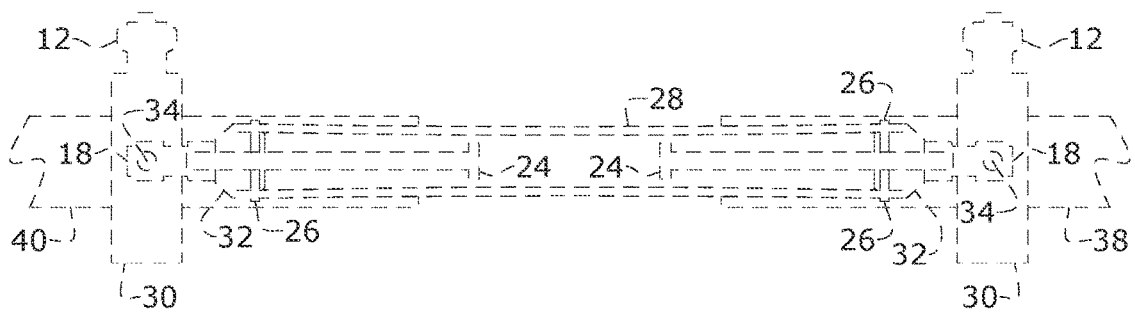
FIG. 6 is a section view taken along line 6-6 from FIG. 5.
Figure 6:
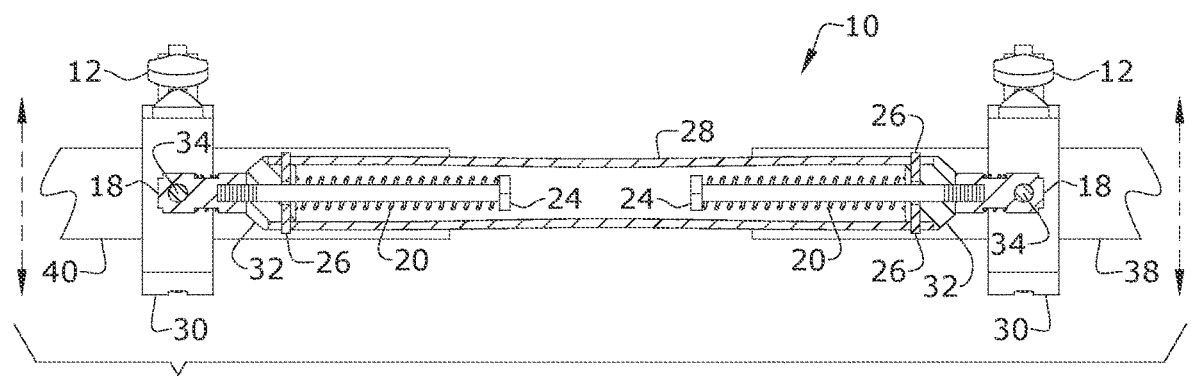

As seen in reference to FIGS. 1-3, a steering bar 10 for a lever-controlled vehicle 36, such as a zero-turn lawn mower is shown in use. The typical lever-controlled vehicle 36 includes a left control lever 38 and a right control lever 40 that are manipulated by the operator 42 to control the direction and speed of the vehicle 36. Movement of the control lever 38, 40 typically controls the motive force and direction of the corresponding drive wheel. In the zero-turn operation, shown in FIG. 1, the left control lever 38 is moved in a forward direction and the right control lever 40 is moved in an rearward direction so that the vehicle 36 tourns about a radius extending from a centerline of the axle supporting the drive wheels. The steering bar 10 couples the left control lever 38 and the right control lever 40 so that the operator may operate the control levers with a single hand by twisting the steering bar 10 about a vertical axis.

As seen in FIGS. 2 and 3, the operator 42 may control the vehicle 36 speed in a forward and a reverse direction by pushing or pulling the steering bar 10 in a forward on an aft direction while maintaining a longitudinal alignment of steering bar 10 with the left control lever 38 and the right control lever 40. Those familiar with the operation of these vehicles will appreciate that in a centered, neutral position of the operating levers 38, 40, no motive force will be applied to the drive wheels.

In the embodiment shown in FIGS. 4-9 the steering bar 10 may include an elongate cylindrical shaft 28 and a control rod 24 extending from at least one of the opposed ends of the cylindrical shaft 28. A tensioning spring 20 is carried on the control rod 24 to dampen movements of the steering bar 10 relative to the control levers 38, 40. An end cap 32 retains the control rod 24 and the tension spring 20 to the elongate cylindrical shaft 28. The end cap 32 may be retained in the end of the elongate cylindrical shaft 28 by a pin 26 extending through a sidewall of the elongate cylindrical shaft 28. The end cap 32 could also be retained by a threaded coupling, or other suitable configuration. Preferably, a control rod 24, end cap 32, and biasing spring are provided on each opposed end of the elongate cylindrical shaft 28.

In the non-limiting embodiments shown, a socket coupling 18 is attached to an end of the control rod 24. The socket coupling 18 is configured to couple with a corresponding ball fitting 34. In this embodiment, the ball fitting 34 is attached to a clamp body 30 with a fastener 22, such as a nut.

The clamp body 30 is dimensioned to fit an end of the corresponding left or right control lever 38, 40. The clamp body 30 has hanger bolt 14 pivotally coupled to a first arm of clamp body via a pin 16. The hanger bolt 14 has a length to span a width of the clamp body 30 and receives a quick release lever 12 which may be actuated against the second arm of the clamp body 30 to secure the clamp body to the corresponding left or right control lever.

Figure 7:
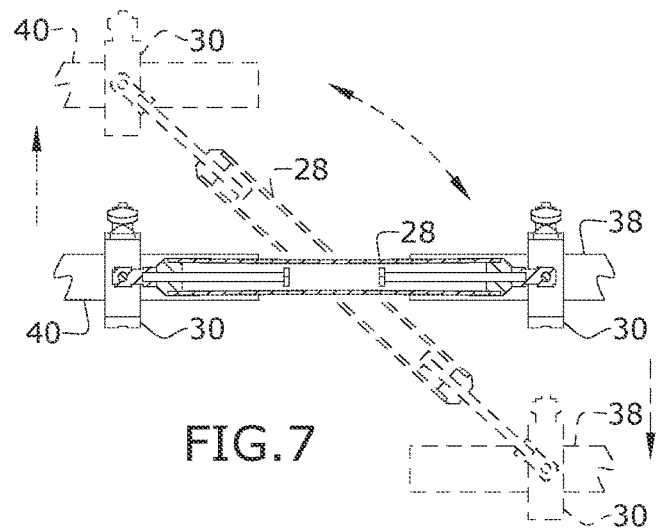
FIG. 7 is a section view similar to FIG. 6.
Figure 8:
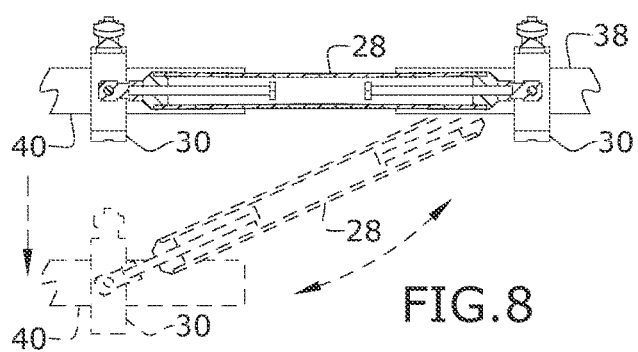
FIG. 8 is a section view similar to FIG. 6.
Figure 9:
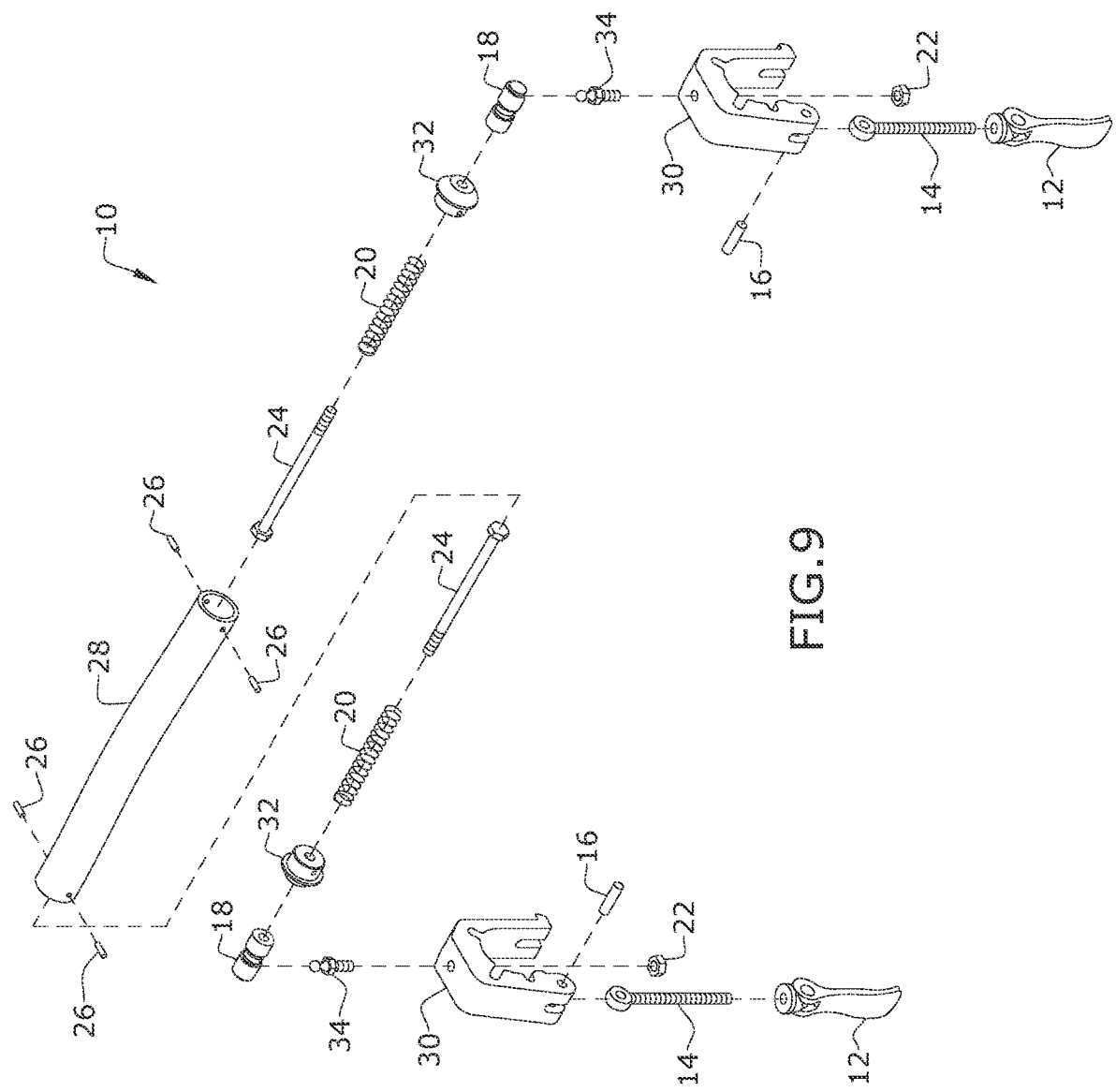
FIG. 9 is an exploded view of the steering lever.

Operation of the steering bar 10 is shown in FIGS. 7 and 8. As the operator 42 rotates the steering bar 10 about a vertical transverse axis to execute a steering movement, the control rod 24 extends from the end of the elongate cylindrical shaft 28 to accommodate for the differential length in the positioning of the clamp bodies 30 as a result of the displacement of the left control lever 38 and the right control lever 40. With the bias of the tension spring 20, the steering bar 10 will return to a non-steering condition, where the left control lever 28 and the right control lever 40 are laterally aligned when the operator 42 releases the twisting force on the steering bar 10. The non-steering condition may be one of a forward, reverse, or a neutral position.

Figures 10, 11:
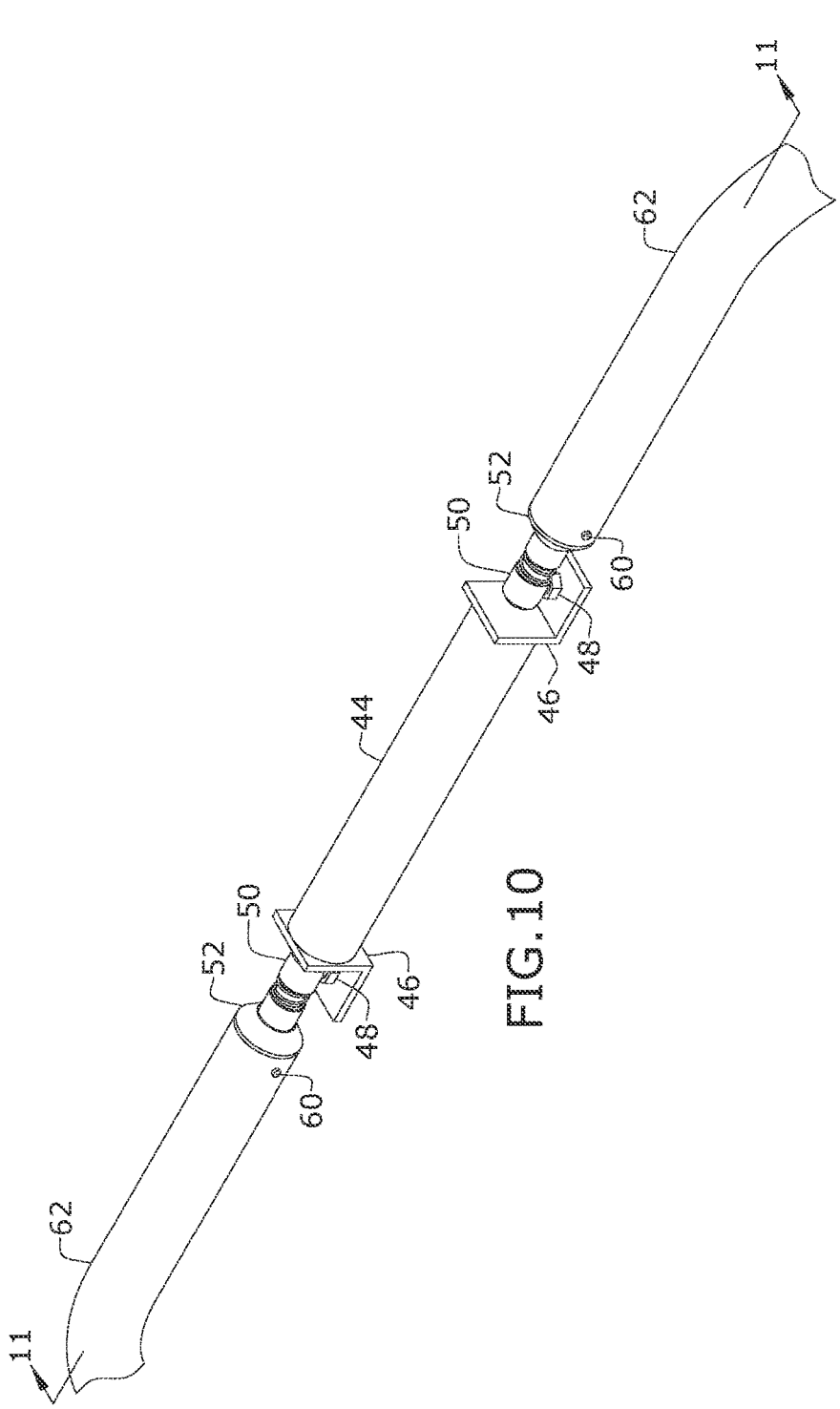
FIG. 10 is a perspective of alternate embodiment of the steering lever.
FIG. 11 is a section view taken along line 11-11 from FIG. 10

In a second non-limiting embodiment, shown in reference to FIGS. 10 and 11, the steering bar 44 is pivotally connected via a ball 48 and a socket 50 coupling between each of the left control lever 62 and the right control lever 62. In this embodiment, the control rod 54 and tensioning spring 58 are carried in the ends of the respective left control lever 38 and the right control lever 40. An end cap 52 is coupled to the ends of the control levers 38, 40, such as by a retaining pin or a threaded coupling. In the embodiment shown, a bracket 46 is provided at opposed ends of the steering bar 44 for mounting the ball 48 of the coupling with the socket 50 carried on the control lever 38, 40. While shown at a 90 degree orientation between the ball 48 and the socket 50, the coupling could also be linearly aligned by changing the orientation of the socket 50 and the ball 48, such that the ball 48 extends from the opposed ends of the steering bar 44 and the socket is aligned with a longitudinal length of the control rod 54. Ball 48 may be attached with a fastener 56, such as a nut. In this embodiment, operation of the vehicle 36 is the same. However, extension of the control rods 54 from the respective control levers 62 accommodates for the differential in length from the displacement of the control levers 62 during a turning movement, with the tensioning spring 58 biasing the control levers 62 to the non-turning alignment.

It should be understood, of course, that the foregoing relates to exemplary embodiments of the invention and that modifications may be made without departing from the spirit and scope of the invention as set forth in the following claims.

What is claimed is:

1. A steering mechanism for a lever-controlled vehicle having a first control lever and a second control lever, comprising:
    an elongate cylindrical shaft having a first end and a second end, the elongate cylindrical shaft having a longitudinal length dimensioned to be interconnected with each of the first control lever and the second control lever; and
    a control rod having a proximal end and a distal end, the proximal end selectively extensible from at least one of the first end and the second end of the elongate cylindrical shaft to accommodate for a differential in a displacement of one or more of the first control lever and the second control lever during a turning movement control input to the lever-controlled vehicle via a rotation of the elongate cylindrical shaft about a vertical transverse axis of the elongate cylindrical shaft; and
    a ball and a socket coupling at a distal end of the control rod, wherein the ball is received within the socket with a multi-axis rotational coupling with at least one of the first control lever and the second control lever.

2. The steering mechanism of claim 1, further comprising:
    a tensioning spring configured to bias the control rod to return the first control lever and the second control lever to a non-steering condition upon a release of the turning movement control input.

3. The steering mechanism of claim 2, wherein the control rod and the tensioning spring are carried within one of the first end and the second end of the elongate cylindrical shaft.

4. The steering mechanism of claim 2, wherein the control rod and the tensioning spring include a first control rod and first tensioning spring carried by the first end of the elongate cylindrical shaft and a second control rod and a second tensioning spring carried by the second end of the elongate cylindrical shaft.

5. The steering mechanism of claim 4, further comprising:
    an end cap coupling each of the first control rod and the second control rod with the elongate cylindrical shaft, wherein each of the first tensioning spring and the second tensioning spring are carried between a head of the respective control rod and the respective end cap.

6. A steering mechanism for a lever-controlled vehicle having a first control lever and a second control lever, comprising:
    an elongate cylindrical shaft having a first end and a second end, the elongate cylindrical shaft having a longitudinal length dimensioned to be interconnected with each of the first control lever and the second control lever; and
    a control rod having a proximal end and a distal end, a coupling at the proximal end for attachment of the control rod with the elongate cylindrical shaft, the distal end of the control rod selectively extensible from an attachment with at least one of the first control lever and the second control lever to accommodate for a differential in a displacement of one or more of the first control lever and the second control lever during a turning movement control input to the lever-controlled vehicle via a rotation of the elongate cylindrical shaft about a vertical transverse axis of the elongate cylindrical shaft; and
    a tensioning spring coupled with the control rod and configured to bias the control rod to return the first control lever and the second control lever to a non-steering condition upon a release of the turning movement control input.

7. The steering mechanism of claim 6, wherein the coupling is a ball and a socket coupling disposed between the distal end of the control rod and at least one of the first end and the second end of the elongate cylindrical shaft.

8. The steering mechanism of claim 6, wherein the control rod and the tensioning spring are carried within an end of at least one of the first control lever and the second control lever.

9. The steering mechanism of claim 6, wherein the control rod and the tensioning spring are each carried within an end of each of the first control lever and the second control lever.

10. The steering mechanism of claim 6, wherein the attachment is an endcap received in a terminal end of the at least one of the first control lever and the second control lever.

11. The steering mechanism of claim 10, wherein the tensioning spring is carried between a head of the control rod and the endcap.

12. An adapter for single-handed operation of a lever-controlled vehicle having a first control lever and a second control lever, the adapter comprising:
an elongate cylindrical shaft having a first end and a second end, the elongate cylindrical shaft interconnected with each of the first control lever and the second control lever via a control rod, such that a twisting of the elongate cylindrical shaft with a single-handed input displaces at least one of the first control lever and the second control lever in a turning movement control input to the lever-controlled vehicle;
the control rod operable with the turning movement control input of the elongate cylindrical shaft to accommodate for a displacement differential of the at least one of the first control lever and the second control lever during the turning movement control input; and
a tensioning spring configured to bias the control rod to return the at least one of the first control lever and the second control lever to a non-steering condition upon a release of the turning movement control input.

13. The adapter of claim 12, wherein the control rod and the tensioning spring are carried in at least one of the first end and the second end of the elongate cylindrical shaft.

14. The adapter of claim 13, further comprising:
a ball and a socket coupling interposed between the at least one of the first control lever and the second control lever and the at least one of the first end and the second end of the elongate cylindrical shaft.

15. The adapter of claim 13, further comprising:
an end cap received in at least one of the first end and the second end of the elongate cylindrical shaft;
the control rod carried through the end cap; and
the tensioning spring operable between the end cap and a head of the control rod.

16. The adapter of claim 12, wherein the control rod and the tensioning spring are carried in a terminal end of at least one of the first control lever and the second control lever.

17. The adapter of claim 16, further comprising:
a ball and a socket coupling interposed between a proximal end of the control rod and the elongate cylindrical shaft.

18. The adapter of claim 16, further comprising:
an end cap received in the terminal end of the at least one of the first control lever and the second control lever;
the control rod carried through the end cap; and
the tensioning spring operable between the end cap and a head of the control rod.

* * * * *